United States Patent Office 3,271,300
Patented Sept. 6, 1966

3,271,300
SILICA-ALUMINA-MAGNESIA-MAGNESIUM
FLUORIDE CATALYST AND PROCESS
Richard W. Baker, Ellicott City, James J. Blazek, Reisterstown, and Frank G. Ciapetta, Silver Spring, Md., assignors to W. R. Grace & Co., New York, N.Y., a corporation of Connecticut
No Drawing. Filed May 11, 1964, Ser. No. 366,596
12 Claims. (Cl. 208—120)

This invention relates to a novel petroleum cracking catalyst and to the highly improved process for using this catalyst. Specifically, this invention releates to a novel fluid petroleum cracking catalyst which provides increased yields of high octane gasoline and light fuel oils with a minimum of coke formation.

In summary, the composition of this invention consists of a petroleum fluid cracking catalyst consisting essentially of microspheroidal particles of silica-alumina-magnesia-magnesium fluoride containing from about .2 to 57.0% alumina, from about 28.3 to .4% magnesia, and from about 14.0 to .1% magnesium fluoride, the balance of this composition being essentially silica, and the process of this invention comprises contacting heavy petroleum fractions with said catalyst at temperatures above 800° F. to produce an increased proportion of high gasoline and light fuel oils with a minimum production of coke.

The preferred embodiments of this invention include catalyst compositions consisting essentially of microspheroidal particles of silica-alumina-magnesia-magnesium fluoride having the compositions as follows:

(1)

| | |
|---|---|
| Alumina | From about 1.0 to 48.0 |
| Magnesia | From about 22.8 to 1.7 |
| Magnesium fluoride | From about 13.2 to .2 |

(2)

| | |
|---|---|
| Alumina | From about .5 to 47.5 |
| Magnesia | From about 28.3 to .4 |
| Magnesium fluoride | From about 14.0 to .1 |

(3)

| | |
|---|---|
| Alumina | From about .2 to 57.0 |
| Magnesia | From about 19.8 to .8 |
| Magnesium fluoride | From about 12.5 to .1 | wherein the balance of each composition is essentially silica. The preferred embodiment of the process of this invention is the method of contacting heavy petroleum fractions with these above catalysts at temperatures above 800° F.

The increased complexity of petroleum refining, caused by the different seasonal and geographical demands as well as by changing product specifications, has brought the need for greater flexibility in catalytic cracking operations. In particular, there is a great need to increase the yield of high octane gasolines and light fuel oils from heavy petroleum fractions in fluid cracking operations presently in operation. The commercially available silica-alumina fluid cracking catalysts do not provide any great change of distributions of products from the cracking operation. Previous silica-magnesia catalyst failed to meet the requirements of the petroleum industry due to insufficient thermal stability. Silica-magnesia-fluoride catalyst have been proven to be commercially operable and a highly stable product and hence are important advances over the silica-magnesia catalysts. However, silica-magnesia-fluoride catalysts product an intrinsically lower octane number gasoline.

It is one object of this invention to provide a novel petroleum cracking catalyst composition which provides an increased yield of gasoline and light fuel oil with less coke and with a minimum decrease in octane of the gasoline produced.

It is another object of this invention to provide a process for cracking heavy petroleum fractions to produce an increased proportion of the high octane gasoline and light fuel oils and with a minimum production of coke.

The composition of this invention is a silica-alumina-magnesia-magnesium fluoride cracking catalyst. This composition is manufactured from commercial silica-alumina and silica-magnesia-magnesium fluoride materials.

The silica-magnesia-magnesium fluoride which is suitable for use in making the composition of this invention is described in Patent No. 2,901,440 to Wilson and Patent No. 3,129,189 to Wilson et al. Silica-magnesia-magnesium fluoride materials which are suitable in this respect have a microspheroidal particle size and contain from about 10 to 40% and preferably from about 20 to 30% magnesium given as magnesium oxide, and from about 0.5 to 5.0% and preferably from 1 to 4% fluoride, the balance being essentially silica.

The silica-alumina which is suitable for use in making the composition of this invention is described in Patent No. 2,886,512 to Winyall, for example, and has a particle size in the micro size range. Suitable silica-alumina material for this use has an alumina content of about from 5 to 60% and a preferred alumina content of from about 10 to 50%, the balance of the composition being essentially silica.

The composition of this invention can be manufactured from the above materials by several procedures. For example, freshly formed and unwashed silica-alumina and silica-magnesia-magnesium fluoride slurries can be mixed together, and the mixture can be spray dried to form microspheroidal particles of silica-alumina-magnesia-magnesium fluoride which are then washed, and flash dried by conventional techniques. Alternatively, the spray dried silica-alumina and silica-magnesia-magnesium fluoride may be reslurried and mixed spray-dried, washed, and then flash dried to form the composition of this invention. Alternatively, the spray dried silica-alumina and silica-magnesia-magnesium fluoride can be reslurried to form a mixed slurry containing both materials which is then washed and flash dried by conventional techniques to form microspheroidal particles of the silica-alumina-magnesia-magnesium fluoride catalyst. The flash dried composition has a particle size in the "fluid" size range, i.e., sized at which the powders are fluid and are suitable for use in fluid catalyst beds. The composition deactivated for use by conventional techniques such as described in Patent No. 3,129,189.

The composition of this invention is also suitable for use in petroleum cracking processes employing granular catalysts. The balls, pills, and extrudates which are suitable for use as a cracking catalyst can be formed from the silica-alumina-magnesia-magnesium fluoride composition of this invention by several conventional techniques. For example, either the mixed or combined powder compositions of this invention can be slurried, mixed with a conventional lubricant such as a fatty acid, rendered plastic by mechanical working, and shaped by agglomeration, piling, or extrusion. The lubricant is then driven or burned from the granular catalyst particles. Alternatively, the granules can be formed directly from the washed slurry containing the composition of this invention before flash drying by removing excess water from the slurry, by adding a lubricant, and by then following the procedure described above.

The invention is further illustrated by the following specific, but non-limiting example of the use of the composition of this invention as a fluid petroleum cracking catalyst and the totally unexpected results obtained.

EXAMPLE 1

In this example, four catalysts were compared to demonstrate the unusual results obtained by the composition of this invention. Silica-alumina, silica-magnesia-magnesium fluoride, and two silica-alumina-magnesia-magnesium fluoride catalysts are compared.

The properties of the silica-alumina catalyst (type A) employed in this example are shown in Table I.

Table I

Chemical analyses, dry basis:
  TV at 1750° F. _____ 14.6
  $Al_2O_3$, wt. percent _____ 27.4
  $Na_2O$, wt. percent _____ 0.033
  $SO_4$, wt. percent _____ 0.44
  Fe, wt. percent _____ .037

The properties of the silica-magnesia-magnesium fluoride catalyst (type B) employed in this example are shown in Table II.

Table II

Chemical analysis, dry basis:
  TV at 1750° F. _____ 10.0
  MgO, wt. percent _____ 19.5
  $Na_2O$, wt. percent _____ 0.05
  $SO_4$, wt. percent _____ 0.2
  $MgF_2$, wt. percent _____ 12.5
  Fe, wt. percent _____ 0.05

Type C and type D catalysts, representing the catalyst of this invention, were obtained by blending the silica-alumina and silica-magnesia-magnesium fluoride materials above. Prior to testing, the catalysts were deactivated by suitable conventional high temperature steam and air calcination treatments to give surface area and pore volume values representative of commercial deactivated catalysts. The analysis of the two catalysts of this invention, not including impurities, is shown in Table III.

Table III

| Catalyst Type | C | D |
|---|---|---|
| $Al_2O_3$, wt. percent | 18.2 | 9.1 |
| MgO, wt. percent | 6.5 | 13.0 |
| $MgF_2$, wt percent | 4.2 | 8.4 |

The physical characteristics of the four catalysts tested in this example are shown in Table IV.

Table IV

| Catalyst Type | A | B | C | D |
|---|---|---|---|---|
| Surface area, m.²/gm | 136 | 310 | 182 | 242 |
| Pore volume, cc./gm | 0.42 | 0.49 | 0.44 | 0.47 |
| Poured density, gm./cc | 0.67 | 0.62 | 0.66 | 0.64 |
| CAE Roller, microns: | | | | |
| 0–20 | | 1.8 | .6 | 1.2 |
| 20–40 | 20.6 | 8.7 | 16.7 | 12.6 |
| 40–80 | 71.3 | 62.0 | 68.2 | 65.2 |
| 80+ | 6.2 | 27.5 | 14.5 | 21.0 |
| APS | 60 | 67 | 62.3 | 64.6 |

The West Texas gas oil which was cracked in the process of this example had properties as shown in Table V.

Table V

Gravity, ° API _____ 27.4
Conradson carbon (10% residuum), wt. percent __ 0.55
Sulfur, wt. percent _____ 0.30
Nitrogen, wt. percent _____ 0.050
Distillation (corrected to 760 mm.):
  10% _____ 716
  50% _____ 809
  90% _____ 918
"K" factor _____ 12.15

Four tests were made, one with each of the different types of catalyst described above. The cracking process was conducted in a fluid cracking apparatus with the quantity of catalyst in the cracking zone maintained at 150 grams. The catalyst to oil ratio in the cracking zone was 4 to 1, and the cracking catalyst temperature was maintained at 920° F. The cracker was operated at atmospheric pressure, and at a feed rate which gave a conversion of 65 percent.

The properties of the products obtained are shown in Table VI.

Table VI

| Catalyst Type | A | C | D | B |
|---|---|---|---|---|
| $C_5$+ Gasoline, vol. percent F.F | 49.5 | 53.5 | 58.0 | 59.5 |
| RVP | 9.1 | 8.6 | 7.2 | 6.0 |
| Gravity, ° API | 58.8 | 58.8 | 58.4 | 57.3 |
| Aniline, Pt., ° F | 66 | 73 | 81 | 92 |
| Distillation (ASTM Method D-86): | | | | |
| 5% | 116 | 118 | 125 | 135 |
| 50% | 202 | 210 | 222 | 240 |
| EP | 440 | 435 | 435 | 425 |
| Composition: | | | | |
| Saturates, vol. percent | 33 | 34 | 38 | 46 |
| Olefins, vol. percent | 29 | 31 | 32 | 33 |
| Aromatics, vol. percent | 38 | 35 | 30 | 21 |
| Octane Nos. (ASTM Method D-908): | | | | |
| Research | 94.4 | 93.9 | 91.6 | 86.5 |
| Research +3 cc. TEL | 99.3 | 98.7 | 97.8 | 96.4 |
| Motor | 79.6 | 78.8 | 77.7 | 76.0 |
| Motor +3 cc. TEL | 85.2 | 85.0 | 84.3 | 83.4 |
| No. 2 Fuel Oil, vol. percent F.F | 10.5 | 11.5 | 15.0 | 18.0 |
| Gravity, ° API | 22.2 | 23.0 | 23.8 | 25.6 |
| Aniline Pt., ° F | 114 | 113 | 110 | 111 |
| Diesel Index | 25 | 26 | 26 | 28 |
| Pour Point, ° F | 47 | 45 | 41 | 35 |
| Coke, wt. percent F.F | 5.6 | 5.0 | 4.4 | 4.0 |
| Hydrogen, wt. percent F.F | 0.067 | 0.064 | 0.066 | 0.057 |
| $C_1$+$C_2$, wt. percent F.F | 2.4 | 2.0 | 1.8 | 1.6 |
| Total $C_3$'s, vol. perce t F.F | 11.2 | 10.3 | 8.2 | 6.4 |
| Total $C_4$'s, vol. percent F.F | 11.9 | 9.4 | 7.9 | 7.8 |

From the results of the comparative tests shown in Table VI, it can be seen that the gasoline yields were unexpectedly higher employing the catalysts of this invention, types C and D, than would be predicted based on the chemical analysis of the compositions of this invention in comparison with the chemical analysis of the other catalysts tested, types A and B. The catalysts of this invention were chosen such that differences between any adjacent values in the Table VI should be equal to the differences between any other of the adjacent values in the table if the result was the proportioned sum of the results obtained by the alumina, magnesia, and magnesium fluoride components. Unexpectedly, however, the gasoline yield employing type B and D catalysts are more than the sum of the results of the active compounds therein, and equally unexpected, the octane number of the gasoline formed was greater than the sum of the results of the active compounds therein.

Also it might be noted that these results were obtained with no increase in coke formation with the increased gasoline and fuel oil yields. Corresponding to the higher formation of gasoline with the catalysts of this invention was a lower production of $C_3$ and $C_4$ hydrocarbon products.

Commercially, these unexpected advantages in the use of the silica-alumina-magnesia-magnesium fluoride catalysts allow the use of the catalyst to obtain increased gasoline and fuel oil productions, the synergistic combination of active compounds providing quantatively superior yields, and with significant increase in the octane number of the gasoline produced. The coke production is also minimized. Therefore, the catalyst compositions of this invention provide a utility which neither the silica-alumina or the silica-magnesia-magnesium fluoride catalysts provide, and constitutes a highly significant advance in the fluid petroleum cracking catalyst and cracking process arts.

Obviously, many modifications and variations of this inventive composition and process as hereinabove set forth may be made without departing from their essence and scope, and only such limitations can be applied, as are indicated in the appended claims.

We claim:

1. A petroleum cracking catalyst consisting essentially of microspheroidal particles of silica-alumina-magnesia-magnesium fluoride containing from about .2 to 57.0% alumina, from about 28.3 to .4% magnesia, and from about 14.0 to .1% magnesium fluoride, the balance being essentially silica.

2. The catalyst of claim 1 wherein the catalyst contains from about 1.0 to 48.0% alumina, from about 22.8 to 1.7% magnesia, and from about 13.2 to .2% magnesium fluoride, the balance of the composition being essentially silica.

3. The catalyst of claim 1 wherein the catalyst contains from about .5 to 47.5% alumina, from about 28.3 to .4% magnesia, and from about 14.0 to .1% magnesium fluoride, the balance of the composition being essentially silica.

4. The catalyst of claim 1 wherein the catalyst contains from about .2 to 57.0% alumina, from about 19.8 to .8% magnesia, and from about 12.5 to .1% magnesium fluoride, the balance of the composition being essentially silica.

5. The catalyst composition of claim 1 wherein the microspheroidal particles are in granular form.

6. The catalyst composition of claim 1 wherein the microspheroidal particles are in the "fluid" size range.

7. A process for cracking heavy petroleum fractions to produce an increased proportion of high octane gasoline and light fuel oils with a minimum production of coke which comprises contacting said fraction at temperatures above about 800° F. with a silica-alumina-magnesia-magnesium fluoride cracking catalyst containing from about 0.2 to 57.0% alumina, from about 28.3 to .4% magnesia, and from about 14.0 to .1% magnesium fluoride, the balance of the catalyst composition being essentially silica.

8. The process of claim 7 wherein the catalyst contains from about 1.0 to 48.0% alumina, from about 22.8 to 1.7% magnesia, and from about 13.2 to .2% magnesium fluoride, the balance of the composition being essentially silica.

9. The process of claim 7 wherein the catalyst contains from about .5 to 47.5% alumina, from about 28.3 to .4% magnesia, and from about 14.0 to .1% magnesium fluoride, the balance of the composition being essentially silica.

10. The process of claim 7 wherein the catalyst contains from about .2 to 57.0% alumina, from about 19.8 to .8% magnesia, and from about 12.5 to .1% magnesium fluoride, the balance of the composition being essentially silica.

11. The process of claim 7 wherein the catalyst is in granular form.

12. The process of claim 7 wherein the catalyst is in the "fluid" size range.

References Cited by the Examiner

UNITED STATES PATENTS

| | | | |
|---|---|---|---|
| 2,459,987 | 1/1949 | Billisoly | 208—120 |
| 2,886,512 | 5/1959 | Winyall | 208—120 |
| 3,129,189 | 4/1964 | Wilson et al. | 208—115 |

DELBERT E. GANTZ, *Primary Examiner.*

A. RIMENS, *Assistant Examiner.*